United States Patent
von Schleinitz

(10) Patent No.: US 12,012,994 B2
(45) Date of Patent: Jun. 18, 2024

(54) BEARING ASSEMBLY

(71) Applicant: Aktiebolaget SKF, Gothenburg (SE)

(72) Inventor: Thilo von Schleinitz, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 22 days.

(21) Appl. No.: 17/700,600

(22) Filed: Mar. 22, 2022

(65) Prior Publication Data

US 2022/0307552 A1  Sep. 29, 2022

(30) Foreign Application Priority Data

Mar. 26, 2021  (DE) .......................... 102021203012.2

(51) Int. Cl.
*F16C 33/64* (2006.01)
*F16C 19/16* (2006.01)
*F16C 33/58* (2006.01)

(52) U.S. Cl.
CPC .............. *F16C 33/64* (2013.01); *F16C 19/16* (2013.01); *F16C 33/583* (2013.01)

(58) Field of Classification Search
CPC ........ F16C 19/16; F16C 33/124; F16C 33/58; F16C 33/583; F16C 33/586; F16C 33/64; F16C 2223/30; F16C 2223/32; F16C 2226/14; B32B 7/028; B29L 2031/04; B29L 2031/045

See application file for complete search history.

(56) References Cited

U.S. PATENT DOCUMENTS

| | | | | |
|---|---|---|---|---|
| 4,109,978 A | * | 8/1978 | Ernst | H02K 5/167 384/282 |
| 4,685,184 A | * | 8/1987 | Satkamp | F16C 13/006 384/275 |
| 5,059,041 A | * | 10/1991 | Watanabe | F16C 33/586 384/536 |

* cited by examiner

*Primary Examiner* — Alan B Waits

(74) *Attorney, Agent, or Firm* — GARCIA-ZAMOR INTELLECTUAL PROPERTY LAW, LLC; Ruy Garcia-Zamor

(57) ABSTRACT

A bearing assembly includes a bearing, in particular a non-locating bearing, for supporting a shaft within a housing. The bearing provides an inner ring and an outer ring. A radially outer surface of the outer ring and/or a radially outer surface of the shaft and/or a radially inner surface of the inner ring and/or a radially inner surface of the housing has a protection layer. The protection layer is a thermally expanding or shrinking layer being thermally heated and expanded to or shrunk on the respective radially inner surface and/or radially outer surface. Further, a method for manufacturing a bearing ring for such a bearing assembly is disclosed.

18 Claims, 2 Drawing Sheets

BEARING ASSEMBLY

CROSS-REFERENCE TO RELATED APPLICATIONS

This application claims priority to German Patent Application no. 102021203012.2, filed Mar. 26, 2021, the contents of which is fully incorporated herein by reference.

TECHNICAL FIELD OF THE INVENTION

The present invention relates to a bearing assembly, in particular a bearing assembly with a non-locating bearing. The present invention further relates to a method for manufacturing a bearing ring for such a bearing assembly.

BACKGROUND OF THE INVENTION

In several industrial applications, for example in the automotive field, it may be necessary to use bearings for supporting a shaft within a housing. As the shaft and/or the housing may experience thermal expansion when in use, at least one bearing may be implemented as non-locating bearing in order to be able to be displaced in the housing when fixed to the shaft, or to be displaced on the shaft when fixed in the housing. Typically, the bearing outer ring can slide in the housing with a loose fit. However, due to the displacement movement of the bearing, the radially outer surface of the outer ring (outer diameter surface) or the radially inner surface of the inner ring (bore surface) is exposed to wear, abrasion and/or corrosion because of the relative movement between the radially outer surface of the outer ring and the inner surface of the housing, when the bearing is fixed on the shaft, or the radially inner surface of the inner ring and the outer surface of the shaft, when the bearing is fixed in the housing. For example, fretting corrosion may occur in bearing assemblies that are exposed to repeated small movements. Further, wear of the housing may occur in particular in cases where light metals, typically aluminum, are used for the housing, e.g., at automotive gearbox housings.

Thus, it is necessary to protect the respective surfaces of the outer ring, the inner ring, the housing or the shaft, in particular in the case of non-locating bearings. This may be done by using a protection coating based for example on manganese phosphate. The manganese phosphate based coating may be chemically deposited on the respective surface of the outer or inner ring. However, such a protection coating is associated with high costs as other surfaces, which should not be coated with manganese phosphate, need to be covered. Further, the performance of a phosphate layer may not be sufficient for severe cases of fretting corrosion or housing wear, and then a sliding lacquer or the like would have to be applied, possibly even above the manganese phosphate layer. Such additional layers need additional separate coating processes and typically a thermal curing, which further increases the costs. As alternative for severe cases of fretting corrosion or housing wear, it is known to coat the affected bearing ring area with a PTFE layer. This may deliver superior sliding properties and highest protection with very low wear and offers a much longer life than other solutions. But the PTFE coating is a very expensive process that can only be applied on large-size rings and low volumes. It is not applicable for smaller parts in cheap mass-production.

SUMMARY OF THE INVENTION

It is therefore object of the present invention to provide a bearing assembly with a protection layer which is easy, fast and cheap to install and at the same time provides superior and permanent resistance.

The bearing assembly may be in particular a bearing assembly with a non-locating bearing, which can be used for supporting a shaft in a housing. The non-locating bearing can compensate for a thermal expansion of the shaft. The bearing comprises an inner ring and an outer ring, wherein the bearing may be a plain bearing or a rolling bearing. In the case of a rolling bearing, rolling elements are arranged between the inner ring and the outer ring. Particularly, such a rolling bearing may be a deep groove ball bearing but may also be any other kind of rolling bearing.

For protecting the radially outer surface of the outer ring or the radially inner surface of the inner ring as well as the respective surfaces of the housing and the shaft, in particular in the case of a non-locating bearing, the respective surface of the outer ring or inner ring may comprise a protection layer. The protection layer could also be installed on the bearing counterpart, e.g., on the shaft or in the housing. To provide an easy to install and cost-efficient protection layer, the protection layer is implemented as a thermally expanding or shrinking layer.

The preferred solution is the use of a shrink tube on the outer diameter surface of the outer ring. This means that the protection layer is realized as a separate part, for example a cut piece of a thin polymer tube and can be arranged on the ring surface and will then be heated and shrunk on the radially outer surface of the outer ring. Further, such a thermally shrinking tube may also be arranged on the radially outer surface of the shaft and shrunk on it accordingly.

Alternatively, the protection layer is a thermally expanding tube being arranged on the radially inner surface of the inner ring or the radially inner surface of the housing, where it may be heated, e.g., with hot pressurized air, and expanded into the respective surface. The thermally expansion or shrinking leads to a fixation of the protection layer to the respective surface of the rings, housing or shaft.

In the following, the thermally expanding or shrinking layer will be explained in further detail with reference to the radially outer surface of the outer ring or the radially inner surface of the inner ring. However, it should be noted that, in any case, the same explanations and features also apply to a thermally expanding or shrinking layer on the radially outer surface of the shaft or on the radially inner surface of the housing. Further, it should be noted that any embodiments, which are explained with a shrinking layer, apply to an expanding layer in an analogue manner.

Such a thermally expanding or shrinking layer can be easily installed on the radially outer surface of the outer ring or on the radially inner surface of the inner ring, without the need to cover other regions of the respective ring as this layer is not chemically immersion coated nor sprayed on the respective ring like previously used manganese phosphate or dry lubricant-based coatings. Instead, the protection layer is a separate element which is joined with the respective ring with the aid of the thermal characteristic of the protection layer. Further, if the protection layer is worn, it can be easily replaced with a new thermally expanding or shrinking layer. The present protection layer can be cut open with a sharp knife and a new tube can be shrunk onto or expanded into the respective surface.

Due to the thermal expansion or shrinking, the protection layer adjusts to the size of the surface it should be joined with. Thus, the protection layer does not need to have accurate dimensions and can be easily manufactured without taking care of precise diameter tolerances. The thermally expanding or shrinking layer should preferably have an exact and thin wall thickness and its initial diameter before installation should not be drastically bigger than the workpiece diameter so that the shrinking factor is low. This provides the advantage that the protection layer is very uniform and copies the form and exactness of the respective surface.

The thermally expanding or shrinking layer can be easily installed on the respective ring by arranging the layer around the radially outer surface of the outer ring or within the radially inner surface of the inner ring and by heating or pressurizing which thermally or mechanically expands or shrinks the layer onto the respective ring, until the thermally expanding or shrinking layer is fixed to the substrate.

According to an embodiment, the thermally expanding or shrinking layer comprises a polymer material, in particular PTFE (polytetrafluoroethylene), PVDF (polyvinylidene difluoride), FEP (fluorinated ethylene propylene) or PFA (perfluoroalkoxy alkane) or any other kind of material which is thermally or mechanically expanding or shrinking. Such a material provides on the one hand a very high and permanent protection of the respective ring surface, higher than the previously used manganese phosphate based coatings and comparable to PTFE coatings. Further, it can be easily installed due to the thermal characteristics of dimensional change as described above. Alternatively, the thermally expanding or shrinking layer may be in the form of a matrix of such a polymer material and may be coated for example with manganese phosphate.

The used material, for example PTFE, may also provide the advantage that it is elastic. Under locally increased pressure, it will show local elastic deformation instead of plastic deformation or wear. If the layer thickness does not meet the tolerances in all areas, the bearing can still be mounted and operates without drawbacks because the layer has some adjustment possibility to meet the required dimension and form.

The thickness of the thermally expanding or shrinking layer may be adapted to the intended application, e.g., to the gap between the outer ring and the housing. A higher thickness does not only provide more wear allowance, but also increased noise isolation. Noise isolation is an important additional requirement in modern vehicles. For example, the thermally expanding or shrinking layer may have a thickness of 0.5 mm, or 0.2 mm, or 0.1 mm, or less.

According to a further embodiment, the thermally expanding or shrinking layer is configured to increase a sliding property of the respective ring surface. The material of the thermally expanding or shrinking layer may be optimized to reduce friction between the inner surface of the housing and the radially outer surface of the outer ring or between the outer surface of the shaft and the radially inner surface of the inner ring. This reduces the wear of the protection layer and of the outer ring as well as of the housing or of the inner ring as well as of the shaft.

According to a further embodiment, the thermally expanding or shrinking layer comprises perforations, wherein the perforations form receiving holes for lubricant storage. Depending on the used material, it may be possible to add either an oil-containing grease-type lubricant or a silicone grease or a dry lubricant. In order to make the lubricant available in the sliding area although only short motion distances are present, it must be deposited inside the sliding area. If the chosen material and application accepts lubrication, then the perforations, or alternatively pores of the material, can be filled with lubricant before the bearing installation.

The perforations may be produced as tube perforations before the installation of the thermally expanding or shrinking layer on the outer ring or inner ring and may be preferably uniformly distributed. When the thermally expanding or shrinking layer is shrunk or expanded, the perforations form recesses within the protection layer. The recesses do not affect the protection characteristics as the number of perforations is low compared to the remaining protection layer surface. Depending on the operation purpose of the bearing, the used lubricant may be electrically conductive to provide a conductive layer between the outer ring and the housing or the inner ring and the shaft, for example for avoiding an electrostatic charge of the bearing and the housing or the shaft. Alternatively, the lubricant and/or the protection layer may also have insulating properties to provide an insulation between the outer ring and the housing. While a (polymer) layer without perforations would mostly be non-conductive, the perforations offer wide possibilities to gain conductivity. The deposited material does not necessarily have to be a lubricant, it can also be other conductive material of low hardness.

According to a further embodiment, the thermally expanding or shrinking layer has the width of the respective bearing ring. An inner or outer bearing ring has chamfers so that the transition between the side faces and the inner or outer diameter surface is rounded and there are no sharp edges. These chamfers are mostly of the radius form. If the thermally expanding or shrinking layer has the same width as the bearing ring, then it will, after shrinking or expanding, copy the form of the outer/inner diameter surface including the chamfers. This means that, at both ends of the ring, the layer will shrink to a smaller diameter and follow the chamfer form or expand to a greater diameter and also follow the chamfer form. This may contribute to an immovable connection between shrunk/expanded layer and ring. If the ring is then moved in the housing or on the shaft, there is no layer end in contact with the housing/shaft where unwanted intermeshing could occur. Instead the layer shows a skid form and lifts off the contact zone before it ends.

According to a further embodiment, the surface of the thermally expanding or shrinking layer being in contact with the respective ring, housing or shaft surface comprises an adhesive or the respective ring, housing or shaft surface comprises an adhesive. This provides the advantage that the thermally expanding or shrinking layer is, in addition to the shrinking or expanding process, adhered to the ring, improving the fixation of the thermally expanding or shrinking layer. This is particularly advantageous during operation when the thermally expanding or shrinking layer, i.e., the protection layer, is moved relatively to the countersurface with high forces. The adhesive may be applied to the thermally expanding or shrinking layer or the ring before the installation on the outer or inner ring, for example as a continuous layer. Alternatively, the adhesive may be applied in a discrete way, for example in the form of dots. Further, the adhesive may be applied only at the axial edges to improve the contact in the border area.

According to a further aspect, a method for manufacturing a bearing ring for the bearing assembly as described above is disclosed. The method may be used for a production in batches, or alternatively for a production in a continuous channel flow.

In a first step, a first plate is provided. This first plate serves as a support plate for receiving a bearing ring, in the case of a batch production for receiving a set of bearing rings. The plate, for example made of metal, is placed in a horizontal, table-like, position.

Preferably, for the mounting of a layer on the outer diameter surfaces of outer rings, the thermally expanding or shrinking layer, which is in the form of a tube, is cut into pieces which have a length that corresponds to the width of the ring. The rings are laid on the steel plate carrier and the cut tube pieces are placed over the rings.

In a second step, the inner ring or the outer ring is arranged together with the thermally expanding or shrinking layer on the first plate so that a first front face of the inner ring or the outer ring is in contact with the first plate. In the case of a batching production, the rings are arranged in a defined batching pattern with distances between each other.

The thermally expanding or shrinking layer may be flexible with a stable shape, like a tube, so that it can be put around the outer ring or within the inner ring without the need to be held separately. Shrinking tubes can be cut into equally long pieces that have the same width as the bearing rings. These shrinking tube rings have a slightly bigger diameter than the bearing rings and can be loosely placed over the positioned rings. In the case of an expanding layer, these layer rings have a slightly smaller diameter than the bearing rings and can be loosely placed in the positioned rings.

A second plate, similar to the first one, is placed on top of the assembly. In case of a batch production, a new batching pattern of rings could be placed on top of this plate to repeat the procedure. The position between two plates safeguards that the shrinking tube cannot protrude over the width of the ring.

Subsequently, the completed assembly of first plate, ring(s) plus thermally shrinking or expanding layer and second plate is uniformly heated up to shrink or expand the tube pieces onto the rings. The heating is made preferably from all sides and at uniform temperature distribution to avoid thickness variations in the tube during shrinking. Preferably, the material of the thermally expanding or shrinking layer shrinks or expands at a temperature, which does not damage the bearing ring, or, in case the whole bearing is already assembled, the bearing with all of its components. A typical temperature may be in the range of 150 to 200° C.

According to a further embodiment, heating the thermally expanding or shrinking layer comprises using a radiation heating device, an air heating device, or a furnace. Preferably, independent on the kind of heating device, the heating step includes heating the ring and the thermally expanding or shrinking layer on all sides simultaneously. This may ensure that the thermally expanding or shrinking layer is attached to the ring in a uniform way, without any dimples or the like, which could occur when heated only partially.

Alternatively, the above-described method may be used in an automatic channel flow. In this case, a ring arrives at the coating station via a conveyor belt or similar transport device. The cut tube piece is automatically blown over or in the ring and the two parts are together clamped between two positioning plates. The positioning plates are connected with a next conveyor system that transports the prepared assembly through a heating chamber. The transport through the heating chamber can be continuous and the chamber length together with the conveyor speed defines the heating duration. Shrinking tubes need heating durations typically between 5 and 30 seconds. At exiting the heating chamber, the shrinking/expanding is finished, and the coated part can be removed by tilting away one of the two retaining plates.

In case the thermally shrinking or expanding layer will be arranged on the housing or shaft, the layer may be arranged within the housing or on the shaft and may then be heated at place.

Further preferred embodiments are defined in the dependent claims as well as in the description and the figures. Thereby, elements described or shown in combination with other elements may be present alone or in combination with other elements without departing from the scope of protection. Further, elements being described in relation to the bearing applies to the method and vice versa.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In the following, preferred embodiments of the invention are described in relation to the drawings, wherein the drawings are exemplarily only, and are not intended to limit the scope of protection.

The figures show.

In the following same or similar functioning elements are indicated with the same reference numerals.

DETAILED DESCRIPTION OF THE PREFERRED EMBODIMENT

Figure 1:
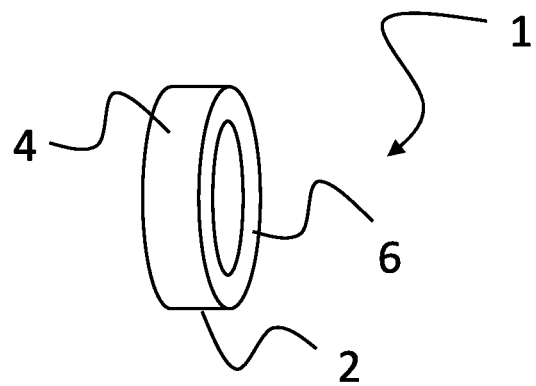
FIG. 1: a schematic perspective view of an embodiment of a ring for a bearing.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 illustrates an outer ring 1 for a bearing, in particular for a non-locating bearing, which can be used for supporting a shaft in a housing. During operation, the radially outer surface 2 of the outer ring 1 moves relative to the housing. Thus, the radially outer surface 2 may experience wear, fretting corrosion and the like. Alternatively, although not shown, the ring may be an inner ring for a bearing, in which case the radially inner surface of the inner ring moves relatively to the shaft and may experience wear, fretting corrosion and the like. The same also applies to the radially inner surface of the housing or the radially outer surface of the shaft. In the following, only an outer ring is described, however, the same principles may apply to an inner ring, a housing or a shaft. In the case of an inner ring or housing, the protection layer is provided in the form of a thermally expanding layer.

For protecting the radially outer surface 2 of the outer ring 1, the radially outer surface 2 of the outer ring 1 comprises a protection layer 4. In contrast to previously used coatings, the protection layer 4 is easy to install and cost-efficient as the protection layer 4 is implemented as a thermally shrinking layer 4. In the case of an inner ring or housing, the protection layer may be implemented as a thermally expanding layer. The thermally shrinking layer 4 can be easily arranged around the radially outer surface 2 of the outer ring 1 and can then be heated to shrink on the radially outer surface 2 of the outer ringl. This process will be described in further detail with reference to FIGS. 4a-4e.

When the thermally shrinking layer 4 is shrunk on, the thermally shrinking layer 4 is fixed on the radially outer surface 2 and serves as a protection layer. Preferably, the thermally shrinking layer 4 provides sliding properties to the radially outer surface 2 of the outer ring 1 with respect to the housing. For example, the thermally shrinking layer may comprise a polymer material, in particular PTFE, PVDF, FEP, or PFA, which has a sliding effect on the radially outer surface 2 of the outer ring 1. Thereby, damages of the outer ring 1 as well as of the housing due to wear and fretting corrosion can be reduced.

Figure 2:
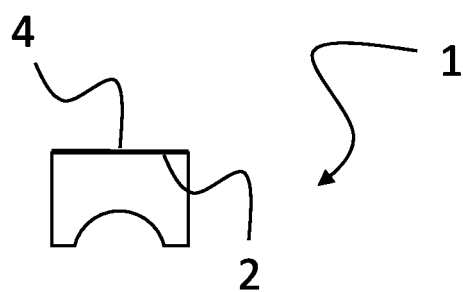
FIG. 2: a schematic sectional view of the ring of FIG. 1.
Figure 3:
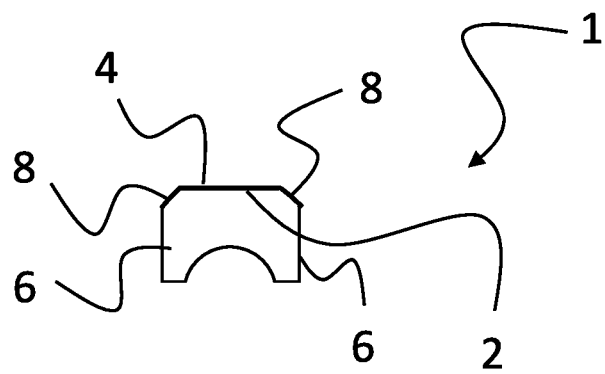
FIG. 3: a schematic sectional view of a further embodiment of a ring for a bearing.

The thermally shrinking layer 4 may be arranged only on the radially outer surface 2, as shown in FIGS. 1 and 2. Alternatively, as shown in FIG. 3, the outer ring 1 may comprise chamfers 8 between the radially outer surface 2 and the front surfaces 6. In this case, the thermally shrinking layer 4 may also cover the chamfers 8. This provides the advantage that the edges of the thermally shrinking layer 4 will not get stuck at the housing as such a sticking could lead to a damage of the thermally shrinking layer 4.

The thermally shrinking layer 4 may comprise perforations (not shown). When shrunk on, the perforations form recesses within the protection layer 4. During operation, lubricant being supplied to the bearing can be received in these recesses.

In the following, a method for manufacturing such an outer ring for a bearing will be described with reference to FIGS. 4a-4e. The same principles apply to an inner ring, in which case the protection layer is a thermally expanding layer which expands when heated and is then arranged and fixed on the radially inner surface of the inner ring.

In a first step (FIG. 4a), a first plate 10 is arranged. Then (FIG. 4b), the outer ring 1 together with the thermally shrinking layer 4 is arranged on the first plate 10. As can be seen, a first front face 6 of the outer ring 1 is in contact with the first plate 10. The thickness of the thermally shrinking layer 4 may be adapted to the intended application, e.g., based on the forces it will experience or adapted to a gap, which will be present between the outer ring 1 and the housing during operation. For example, the thermally shrinking layer 4 may have a thickness of 0.5 mm or less.

The thermally shrinking layer 4 can be produced separately and can then be arranged around the outer ring 1. Preferably, the thermally shrinking layer 4 has a stable shape, like a tube, so that it can be arranged around the outer ring 1 without any additional fixation means.

As the thermally shrinking layer 4 is not disposed by spraying or the like, there is no need to cover other surfaces of the ring 1. Further, if the protection layer being provided by the thermally shrinking layer 4 is worn, it can be easily replaced with a new thermally shrinking layer 4.

Figure 4A:
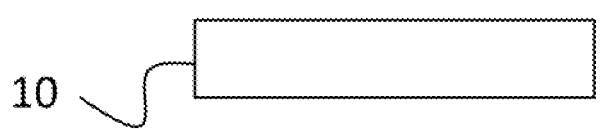
FIGS. 4*a*-4*e*: steps of a method for manufacturing the ring of FIGS. 1 and 2.
Figure 4B:
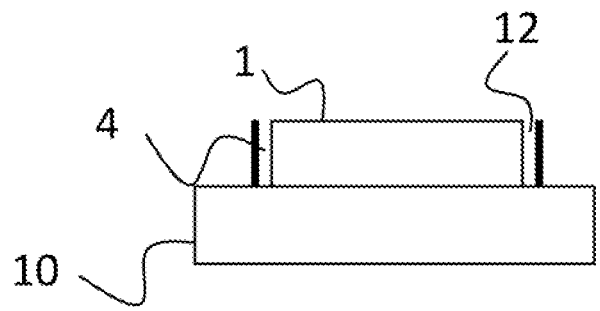
Figure 4C:
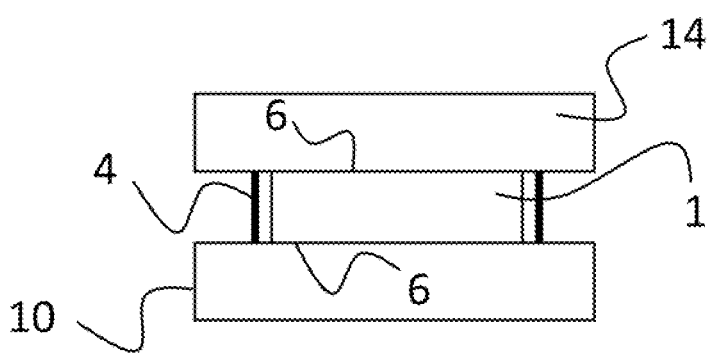
Figure 4D:
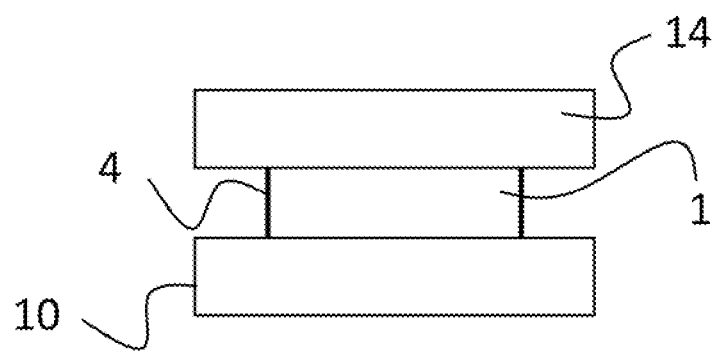

As can be seen in FIG. 4b, there is a gap 12 between the thermally shrinking layer 4 and the outer ring 1. This gap 12 will be closed when heating and thus shrinking the thermally shrinking layer 4.

In a further step (FIG. 4c), a second plate 14 is arranged on the outer ring 1. Thereby, the outer ring 1 and the thermally shrinking layer 4 are fixed between the first and the second plate 10, 14. The second front face 6 of the outer ring 1 is in contact with the second plate 14.

Subsequently, the thermally shrinking layer 4 will be heated to shrink the thermally shrinking layer 4 on the outer ring 1. Heating may be done using a radiation heating device, an air heating device, or a furnace. Preferably, the outer ring 1 and the thermally shrinking layer 4 are heated on all sides simultaneously to ensure that the thermally shrinking layer 4 is attached to the outer ring 1 in a uniform way. After the heating (FIG. 4d), the gap 12 between the thermally shrinking layer 4 and the outer ring 1 is eliminated and the thermally shrinking layer 4 forms a protection layer being arranged on the radially outer surface 2 of the outer ring 1.

The assembly of the first plate 10, the outer ring 1 with the thermally shrinking layer 4 and the second plate 14 may be heated together. Thereby, the thermally shrinking layer 4 is aligned with the outer ring 1 and does not shift during the heating process. To improve the adhesion of the thermally shrinking layer 4 to the outer ring 1, the thermally shrinking layer 4 may have an adhesive on the inner surface being in contact with the radially outer surface 2 of the outer ring 1.

Figure 4E:
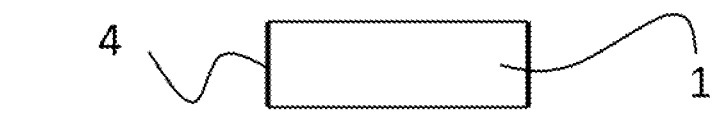

After the heating, the first plate 10 and the second plate 14 may be removed (FIG. 4e). In case that the thermally shrinking layer 4 protrudes from the radially outer surface 2 of the outer ring 1 in the direction of the front surfaces 6, the protruding parts of the thermally shrinking layer 4 may be cut off.

In summary, the described thermally shrinking or expanding layer forming a protection layer provides an easy way to equip a bearing assembly with a protection layer, in particular when used with a non-locating bearing for supporting a shaft in a housing.

The invention claimed is:

1. A method for manufacturing a bearing assembly, the bearing assembly having a bearing that is non-locating and is configured to support a shaft within a housing, the bearing comprises an inner ring and an outer ring, a radially outer surface of the outer ring and/or a radially outer surface of the shaft and/or a radially inner surface of the inner ring and/or a radially inner surface of the housing comprise a protection layer, wherein the protection layer is a thermally expanding or shrinking layer being thermally heated and expanded to or shrunk on the respective radially outer surface of the outer ring and/or radially outer surface of the shaft and/or radially inner surface of the inner ring and/or radially inner surface of the housing, the method comprising the steps of:
providing a first plate,
arranging the inner ring or the outer ring together with the thermally expanding or shrinking layer on the first plate so that a first front face of the inner ring or the outer ring is in contact with the first plate,
arranging a second plate on the inner ring or the outer ring so that the inner ring or the outer ring and the thermally expanding or shrinking layer are fixed between the first and the second plate, wherein
the second front face of the inner ring or the outer ring is in contact with the second plate, and
heating the thermally expanding or shrinking layer for expanding the thermally expanding or shrinking layer to the inner ring or for shrinking the thermally expanding or shrinking layer on the outer ring.

2. The method according to claim 1, wherein heating the thermally expanding or shrinking layer comprises heating of the thermally expanding or shrinking layer and the inner ring or the outer ring using a radiation heating device, an air heating device, or a furnace.

3. The method according to claim 2, wherein the heating step includes heating the inner ring or the outer ring and the thermally expanding or shrinking layer on all sides simultaneously.

4. A method for manufacturing a bearing ring for a bearing assembly, the bearing ring comprising an inner ring or an outer ring, the method comprising the steps of:
providing a first plate that serves as a support plate for receiving the inner ring or the outer ring;
arranging the inner ring or the outer ring with a thermally expanding or shrinking layer on the first plate;
wherein a first front face of the inner ring or the outer ring contacts the first plate;
placing a second plate on top of the inner ring or the outer ring;
uniformly heating the first plate, the inner ring or the outer ring, the thermally shrinking layer or expanding layer, and the second plate.

5. The method of claim 4, wherein the step of arranging the inner or the outer ring includes arranging the inner ring or the outer ring in a defined batching pattern with distances between each other.

6. The method of claim 4, further comprising the step of cutting the shrinking layer into pieces of equal length that have the same width as the bearing ring and a larger diameter than the bearing ring.

7. The method of claim 4, wherein the step of arranging the inner ring or the outer ring comprises placing the shrinking layer over the bearing ring, the inner ring, or the outer ring.

8. The method of claim 4, wherein the step of arranging the inner ring or the outer ring comprises placing the thermally expanding layer in the bearing ring, the inner ring, or the outer ring.

9. The method of claim 4, wherein the step of heating comprises heating from all sides and at a uniform temperature distribution.

10. The method of claim 4, wherein the step of heating does not damage the bearing ring and its components.

11. The method of claim 4, wherein the step of heating comprises heating in the range of one-hundred-fifty degrees Celsius (150° C.) to two-hundred degrees Celsius (200° C.).

12. A method for equipping a bearing assembly with a protection layer, the method comprising the steps of:
providing a first plate;
arranging an outer ring and a thermally shrinking layer on the first plate;
wherein the outer ring comprises a first front face, a second front face, and a radially outer surface, and the first front face of the outer ring contacts the first plate;
arranging a second plate on the outer ring, such that the thermally shrinking layer and the outer ring are fixed between the first plate and the second plate;
wherein the second front face of the outer ring is in contact with the second plate;
heating and shrinking the thermally shrinking layer on the outer ring on all sides simultaneously;
closing any gaps between the thermally shrinking layer and the outer ring;
wherein the thermally shrinking layer forms the protection layer arranged on the radially outer surface of the outer ring;
removing the first plate and the second plate after heating.

13. The method of claim 12, wherein the step of arranging the outer ring and the thermally shrinking layer does not require any additional fixation means.

14. The method of claim 12, wherein the step of heating comprises heating the thermally shrinking layer and the second plate together.

15. The method of claim 12, wherein the step of closing any gaps is performed by heating.

16. The method of claim 12, wherein the step of heating comprises heating the outer ring and the thermally shrinking layer on all sides simultaneously.

17. The method of claim 12, further comprising the step of providing an adhesive on an inner surface of the thermally shrinking layer, wherein the inner surface of the thermally shrinking layer contacts the radially outer surface of the outer ring.

18. The method of claim 12, further comprising the step of removing any protruding parts of the thermally shrinking layer.

* * * * *